Figure 1:
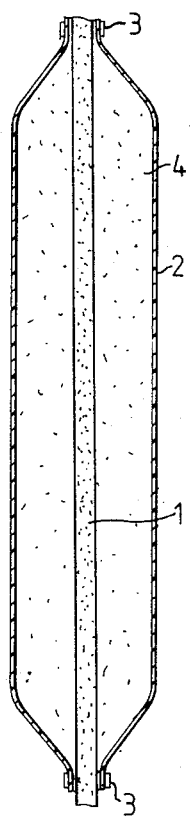

United States Patent [19]

Murphy et al.

[11] Patent Number: 4,558,781
[45] Date of Patent: Dec. 17, 1985

[54] CARTRIDGE FOR USE IN ANCHOR BOLTING

[75] Inventors: John M. Murphy, Mansfield; Robert H. Spensley, Swanwick; John Ellis, Sutton in Ashfield, all of Great Britain

[73] Assignee: Societe Anonyme d'Explosifs et de Produits Chimiques, Paris, France

[21] Appl. No.: 277,344

[22] Filed: Jun. 25, 1981

[30] Foreign Application Priority Data

Jul. 23, 1980 [GB] United Kingdom ............... 8024032

[51] Int. Cl.⁴ .................................................. B65D 25/08
[52] U.S. Cl. ..................................... 206/219; 206/0.5
[58] Field of Search ............................... 206/219, 0.5

[56] References Cited

U.S. PATENT DOCUMENTS

| | | | |
|---|---|---|---|
| 3,186,869 | 6/1965 | Friedman | 206/0.5 |
| 3,294,224 | 12/1966 | Horwitz | 206/0.5 |
| 3,359,361 | 12/1967 | Oakman | 206/219 |
| 3,717,303 | 2/1973 | Daeninckx et al. | 206/0.5 |
| 3,902,596 | 9/1975 | McVay | 206/524.4 |
| 4,188,304 | 2/1980 | Clarke et al. | 206/0.5 |

FOREIGN PATENT DOCUMENTS

| | | | |
|---|---|---|---|
| 652134 | 11/1962 | Canada | 206/0.5 |
| 473305 | 7/1969 | Switzerland | 206/219 |

Primary Examiner—Joseph Man-Fu Moy
Attorney, Agent, or Firm—Wood, Dalton, Phillips, Mason & Rowe

[57] ABSTRACT

An anchoring cartridge for use in anchor bolting in a rock substrate such as an underground mine roof comprises a frangible casing formed from a liquid-impermeable material, the casing containing a particulate liquid-settable solid component, such as a hydraulic cement, which is in contact with a longitudinally extending absorbent material preferably both ends of which communicate with, or are adapted to communicate with, the exterior of the cartridge so that when the cartridge is immersed in an activating liquid for the solid component, such as water, the liquid is drawn into the cartridge by the absorbent material and thereby comes into contact with the solid component over its whole length within the casing. This helps to assist in the formation of a self-setting grouting composition of substantially uniform strength when the cartridge is used in a borehole drilled in the substrate.

10 Claims, 8 Drawing Figures

CARTRIDGE FOR USE IN ANCHOR BOLTING

This invention relates to the anchoring of reinforcing or fixing elements such as anchor bolts in a borehole drilled in a substrate such as an underground mine roof, and is concerned with an anchoring cartridge containing a liquid-settable solid component, which in use is brought into contact with an activating liquid component capable of reacting therewith to form a self-setting grouting composition.

Two principal non-mechanical methods of anchoring a reinforcing element in a borehole in a substrate have been utilised, one based on hydraulic cement systems and the other on hardenable synthetic resin systems, generally an unsaturated polyester resin system. Both systems have been employed as cartridged systems, in which the reactive components of the system are both packaged in a frangible cartridge, generally in separate compartments, and the cartridge is introduced into the borehole and then broken and the contents mixed in situ by means of a rotating reinforcing element to form a self-setting grouting composition around the reinforcing element.

Cartridges containing unsaturated polyester resin systems exhibit high flammability and toxicity and hence their use in confined areas such as coal mines gives rise to an unacceptable risk which has recently become of increasing concern and which has therefore given rise to increased interest in the use of cartridged hydraulic cement systems, additionally because of the increasing cost of polyester resins resulting from higher oil prices.

French Patent Specification No. 2202548 (which corresponds to German Offenlegungsschrift No. 2350298) describes a cartridge in which a rapidly setting dry hydraulic cement mortar is packaged in a porous paper tube. When required for use, the paper tube is immersed in water for a time sufficient to allow water to penetrate through the tube and hydrate the dry mortar and the moistened tube is then inserted into the borehole prior to insertion of the reinforcing element. This cartridge has disadvantages, the major one being that the porous tube becomes weakened after immersion in water and hence is difficult to handle when wet particularly if the cartridge is longer than about 200 mm.

A similar immersion-activated cartridge is described in British Patent Specification No. 2004965A, the cartridge casing consisting of a liquid-permeable paper or a perforated plastics film material, but also having a rigidifying member, for example a rigid but brittle plastics netting, which serves to make the moistened cartridge more manageable.

Cartridges such as those described in the aforementioned prior specifications, i.e. cartridges which must be activated by immersion in water prior to insertion in the borehole, suffer from disadvantages, for instance, when the cartridge casing is formed from a perforated plastics film, a proportion of the hydratable powder tends to escape from the casing so that the cartridges are unpleasant to handle. Similarly, after immersion a proportion of the wetted mortar tends to seep from the casing so that again handling is unpleasant.

It is an object of the present invention to provide an anchoring cartridge based on a liquid-activated solid component which mitigates the disadvantages possessed by the cartridges described above.

According to the invention, there is provided an anchoring cartridge for use in anchoring a reinforcing or fixing element in a borehole in a substrate, the cartridge comprising a frangible casing formed from an inert, liquid-impermeable material, the casing containing a particulate liquid-settable solid component in contact with a substantially longitudinally extending absorbent material at least one end portion of which communicates with, or is adapted to communicate with, the exterior of the cartridge, whereby when the cartridge, or at least said one end portion of the cartridge, is immersed in an activating liquid component capable of reacting with the solid component so as to cause it to set, the activating liquid component is drawn into the cartridge by the absorbent material disposed therein and is enabled to come into contact with the solid component over substantially its whole length within the casing.

In one embodiment of the invention the longitudinally extending absorbent material is exposed at one end, preferably at both ends of the cartridge. In another embodiment the absorbent material is confined within the casing but each end of the cartridge is provided with a passageway which enables the absorbent material to communicate with the exterior of the cartridge. In a further embodiment, both ends of the cartridge are sealed, but the absorbent material can be caused to communicate with the exterior of the cartridge by perforating the casing at each end portion thereof.

The absorbent material may be in the form of a longitudinally extending wick consisting of, for example, absorbent paper, which may be twisted or folded, or in the form of a thread or string, or a woven or non-woven tape, consisting of, for example natural or synthetic fibres. Alternatively the absorbent material may be in the form of an inner container for the particulate liquid-settable solid component.

The disposition of the absorbent material within the cartridge casing may be varied without substantially affecting the ease of liquid transmission into the liquid-settable solid component contained in the casing. Various configurations of absorbent material are illustrated in the accompanying drawings, in which FIG. 1 illustrates an embodiment in which the absorbent material 1 is in the form of a wick which is axially disposed within the cartridge. The cartridge casing 2 consists of flexible thermoplastic tubular film and is secured around the wick at each end of the cartridge with a plastics or metal closure 3 which grips the wick firmly but without compression in a manner sufficient to allow rapid liquid transmission through the wick material and into the particulate solid component 4.

Figure 2:
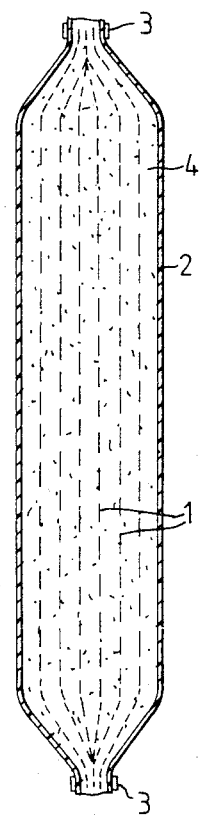

FIG. 2 illustrates a cartridge in which the absorbent material 1 is in the form of spirally wound absorbent paper wick. To produce such a cartridge the liquid-settable particulate solid component 4 is spread on a flat sheet of paper which is then rolled to form a cylindrical package which is introduced into the flexible outer casing 2. The powdered solid 4 is spread progressively more thinly at the outer edges of the paper so that on rolling the sheet the cylindrical package has tapered ends consisting finally only of rolled paper. The outer casing 2 is lightly clipped with closures 3 around these rolled ends which then provide the exposed ends of the absorbent wick for ingress of water or other activating liquid.

Figure 3:
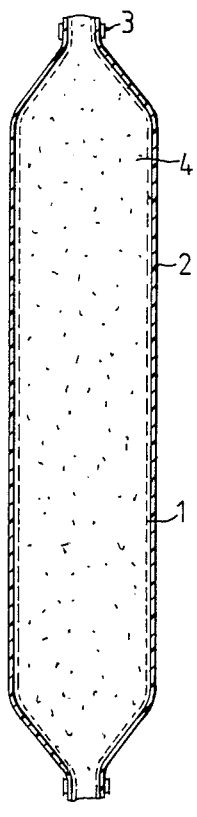
Figure 1A:
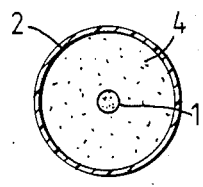
Figure 2A:
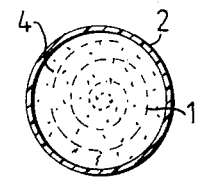
Figure 3A:
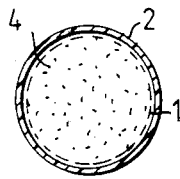

FIG. 3 illustrates a cartridge in which the absorbent material 1 forms an inner lining to the outer flexible casing 2.

Figure 4:
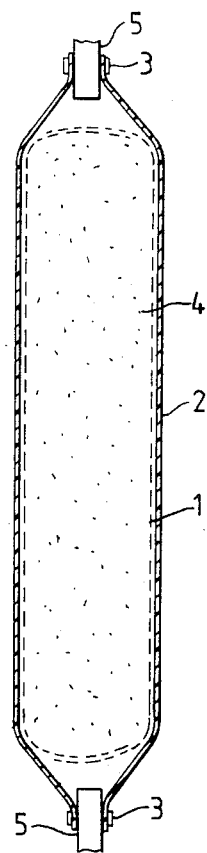

FIG. 4 illustrates a cartridge in which the absorbent material 1 is formed into an inner tubular container the ends of which are adjacent the ends of the cartridge respectively. Each end is provided with a tubular opening 5 through which liquid may enter and air may escape when the cartridge is immersed in an activating liquid. Preferably this tubular opening consists of a short length of small diameter brittle plastics tube.

Figure 5:
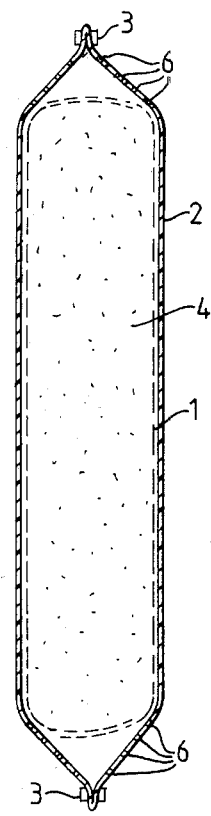

FIG. 5 illustrates a cartridge in which the absorbent material 1 is formed into an inner tubular container the ends of which are adjacent the ends of the cartridge respectively. The ends of the cartridge are sealed with closures 3, but the casing is perforated with small diameter holes 6, adjacent the end closures 3, through which liquid may enter and air may escape when the cartridge is immersed in an activating liquid. The perforations may be made on-site just prior to activation of the cartridge or may be formed during manufacture. In the latter case they may be temporarily sealed with, for example, adhesive tape which may be removed prior to activation.

The particulate liquid-settable solid component, which in the context of the present invention means a non-fluid component, i.e. a component which will not readily flow within the cartridge casing, may be in the form of discrete pellets, granules, tablets or capsules, or in the form of a powder.

The liquid-settable component may be a hydraulic cement, for example a Portland cement, high alumina cement, blast furnace cement, pozzolanic cement or calcium sulphate (gypsum) plaster, either alone or in admixture, in which case the activating liquid component in which the cartridge will be immersed will comprise water. Other modifying inorganic materials, for example lime, anhydrite, fly ash or other pozzolans, may be present in the hydraulic cement component, together with metals or inorganic salts to accelerate or retard the rate of hydration and/or strength development and to promote expansion or minimise shrinkage. Such inorganic additives are well known in the art and include, for example, sulphoaluminates, finely-divided metals such as iron, aluminium and zinc, and ammonium, sodium, potassium, lithium, calcium, magnesium, zinc and aluminium salts of inorganic or organic acids.

Other organic materials may be present as plasticisers, or as agents for the control of air entrainment, rheology or setting rate.

Organic polymers may be used to modify the physical characteristics of the hydraulic materials. The polymers may be present in the form of dry powders or granules which may be dissolved or dispersed in the solid component. Such polymers include water-soluble resins, for example urea-formaldehyde or melamine-formaldehyde resins, polyacrylic acids or acrylic esters, or thermoplastic emulsion or suspension polymers.

Besides the particulate self-setting systems based on hydraulic cements, there may be used systems based on other settable inorganic materials, for example a system comprising:

(a) at least one acidic oxyphosphorus compound selected from phosphoric acids, e.g. $H_3PO_4$, anhydrides of phosphoric acid, e.g. $P_2O_5$, and salts of phosphoric acid with multivalent metal cations, e.g. $Al(H_2PO_4)_3$; and (b) a particulate basic component comprising at least one particulate basic compound of a Group II or Group III metal capable of reacting with the oxyphosphorus compound in the presence of water as the activating liquid to form a monolithic solid, e.g. magnesium oxide or hydroxide, magnesium silicate, magnesium aluminate or calcium aluminate. Alternatively only the particulate basic component (b) may be contained in the cartridge casing and an aqueous solution of the oxyphosphorus compound (a) may be used as the activating liquid.

A further example of an inorganic settable composition usable in the cartridge of the invention comprises, in essence, burned magnesite as the solid component and an aqueous solution of magnesium chloride and/or magnesium sulphate as the activating liquid component. Alternatively a dry powder mixture of burned magnesite and magnesium chloride may comprise the solid component contained in the cartridge casing, in which case the activating liquid can comprise water.

The solid component present in the cartridge may contain particulate fillers, for example silica, calcite, limestone, dolomite or granite and/or fibrous fillers, for example asbestos, glass fibre, steel fibre, rock wool, cellulose fibres, shredded paper, or synthetic resin fibres, e.g. polyamide, polyolefin or polyester fibre. The use of a proportion of fibrous filler may assist liquid penetration into the solid component.

The frangible casing of the cartridge can be made from any material which is not permeable to, or readily attacked by, the contents of the cartridge or the activating liquid in which it is to be immersed and which will rupture under the force of stemming the cartridge in a borehole or of inserting an anchor bolt through the cartridge. To facilitate the latter operation, relatively weak materials are preferred for use as the cartridge casing. Examples of these are tubular thermoplastics film, e.g. polyester, polyethylene, polyamide, polyvinyl chloride or polyvinylidene chloride film, laminate film, e.g. thermoplastics/thermoplastics or thermoplastics/cellulose laminates, waterproofed paper/cloth laminates, metal foil and laminates of metal foil with plastics or paper sheeting. These materials are flexible and allow the cartridge to be manipulated so as to aid mixing of the activating liquid with the solid component. However, certain rigid materials may alternatively be used as the outer casing, or part of it. Such rigidity can assist in placing of the intramixed cartridge in the hole. Examples of suitable rigid casing materials are tubular polystyrene or modified polystyrene, polymethyl methacrylate, waterproofed cardboard, wood and glass.

The invention is illustrated by the following Examples.

EXAMPLE 1

A thin-walled rigid polystyrene tube, 35 mm in diameter and 200 mm in length, was used as the casing for an anchor bolt-fixing cartridge. A paper wick, made from a 400 mm single ply square of "Kim Wipe" absorbent paper by rolling up the sheet and then twisting it six times, was positioned along the axis of the tube by means of two centrally-holed corks which fitted respectively into the ends of the tube so that the ends of the wick protruded slightly through the corks. With one of the corks removed, but with the wick still in position, the tube was filled with 250 g of the following dry powdered mixture:

|  | Parts by weight |
| --- | --- |
| Rapid hardening Portland cement | 140 |
| Pulverised fuel ash | 70 |
| "Chelford 50" sand (British Industrial Sands) | 35 |
| "Irgament Mighty" (Ciba-Geigy) | 4.2 |
| Cem-FIL AR glass fibre (12 mm long) (Pilkington Bros.) | 2.5 |

Irgament Mighty is a Category B superplasticiser from Ciba-Geigy.

After the tube had been filled, the cork was refitted into the end of the tube.

Three cartridges made according to the above procedure were placed vertically in a tank of water with the tops of the cartridges approximately 100 mm below the surface of the water. Water percolated into the cartridges predominantly through their bottom ends whilst air escaped from their top ends. When the cartridges were fully soaked, after approximately 10 minutes immersion, they were removed from the tank and placed in a 600 mm deep, 37 mm diameter borehole drilled in a block of concrete. A 19 mm diameter, 800 mm long rebar (i.e. a deformed concrete reinforcing bar) was hammered through the cartridges, which ruptured under the impact. After 24 hours, a hydraulic jack was used to tension the rebar. At a load of 16 tons the rebar broke without having moved substantially out of the concrete block.

EXAMPLE 2

An anchor bolt-fixing cartridge was made from a 300 mm length of flexible tubular polyester film of 35 mm diameter as the casing and an axial paper wick of the type described in Example 1. The cartridge was filled with 360 g of the following dry powdered mixture:

|  | Parts by weight |
| --- | --- |
| "Crystacal R" gypsum plaster (British Gypsum) | 100 |
| Cem-FIL AR glass fibre (12 mm long) | 1 |
| "Irgament Mighty" | 1 |

The ends of the cartridge were tied loosely with string, with the wick ends being in the same plane as the ends of the polyester tube.

Three cartridges made in the above manner were immersed in water in a vertical position in the manner described in Example 1. After about 4 minutes, when the cartridges were fully soaked, they were stemmed into a 750 mm deep borehole drilled in a block of sandstone. A 19 mm diameter rebar was hammered through the capsules. After 8 hours, the anchorage of the rebar in the borehole was tested with a hydraulic jack. A pull-out load of 8 tons was sustained by the rebar.

EXAMPLE 3

An anchor bolt-fixing cartridge (of the type illustrated in FIG. 4) was made from a 330 mm length of tubular polyester film of 38 mm diameter. An inner absorbent tubular container was formed by sprially winding single ply bleached dry crepe tissue paper on a 37 mm diameter tubular former. One end was closed by twisting the paper and the inner container was filled with 500 g of the following dry powdered mixture:

|  | Parts by weight |
| --- | --- |
| Ordinary Portland cement (coarse ground) | 100 gm |
| Melment F10 | 3 gm |

Melment F10 is a category A superplasticiser available from Hoechst Chemicals Ltd.

The filled inner container was closed by folding the paper over the open end and it was then inserted into the length of tubular polyester film. Each end of the filled cartridge was then closed around a short length of polystyrene tube of 6 mm internal diameter by means of a metal clip.

Three of the foregoing cartridges were immersed vertically in water. Streams of air bubbles rose from the upper ends and water entered rapidly, mainly through the lower ends. After four minutes the emission of air bubbles ceased and the cartridges were removed from the water. Check weighing indicated that water uptake equivalent to approximately thirty percent of the dry weight of the cartridge had occurred in each case.

The three activated cartridges obtained in this manner were inserted into a 43 mm diameter borehole to a depth of 1.7 meters in sandstone rock. A 36 mm diameter, 2.4 meter long wooden dowel was inserted through the cartridges while rotating at 600 revolutions per minute. Insertion was achieved without difficulty and the resulting mixed cement grout completely filled the annular space between the dowel and the wall of the borehole. After 18 hours a tensile load was applied pregressively to the protruding end of the dowel. The wood failed in tension at an applied load of 11 tonnes without apparent disturbance of the cement anchor.

EXAMPLE 4

An anchor bolt-fixing cartridge (of the type illustrated in FIG. 5), was made from a 330 mm length of tubualr polyester film of 38 mm diameter. An inner absorbent tubular paper container was made and filled in the manner described in Example 3 and inserted into the length of tubular film. Each end of the cartridge was tightly closed by means of a metal clip.

Just prior to activation four holes, each of approximately 1 mm diameter, were pierced at each end of the cartridge, adjacent the metal clip closure.

Three cartridges prepared in this manner were immersed substantially vertically in water. Streams of air bubbles rose from the upper ends of the cartridges and water absorption equivalent to about thirty percent of the dry weight was complete in 3.5 minutes. The three activated cartridges obtained in this manner were inserted into a 43 mm diameter borehole drilled to a depth of one meter in a concrete block. A 25 mm diameter steel dowel having a deformed reinforcing bar pattern was inserted through the cartridges while rotating at 450 revolutions per minute. The resulting mixed cement grout completely filled the annular space between the steel dowel and the wall of the borehole. After 24 hours a tensile load was applied progressively to the protruding end of the steel dowel. Tensile failure of the steel occurred at a load of 24 tonnes without failure of the cement anchor.

We claim:

1. An anchoring cartridge for use in anchoring a reinforcing or fixing element in a borehole in a substrate, the cartridge comprising a frangible casing formed from an inert, liquid-impermeable material, the casing containing a particulate liquid-settable solid component in contact with a substantially longitudinally extending absorbent material at least one end portion of which communicates with, or is adapted to communicate with, the exterior of the cartridge, whereby when the cartridge, or at least said one end portion of the cartridge, is immersed in an activating liquid component capable of reacting with the solid component so as to cause it to set, the activating liquid component is drawn into the cartridge by the absorbent material disposed within the liquid-impermeable casing and is enabled to come into contact with the solid component over substantially its whole length within the casing.

2. A cartridge as claimed in claim 1, wherein the longitudinally extending absorbent material is exposed, or adapted to be exposed, at both ends of the cartridge.

3. A cartridge as claimed in claim 2, wherein the longitudinally extending absorbent material is confined within the casing and each end of the cartridge is provided with a passageway enabling the absorbent material to communicate with the exterior of the cartridge.

4. A cartridge as claimed in claim 2, wherein the absorbent material is in the form of a longitudinally extending wick.

5. A cartridge as claimed in claim 4, wherein the wick is in the form of a spirally wound sheet.

6. A cartridge as claimed in claim 4, wherein the wick forms an inner lining to the frangible casing.

7. A cartridge as claimed in claim 3, wherein the absorbent material forms an inner tubular container for the particulate liquid-settable solid component, the ends of the container being adjacent to the passageway at each end of the cartridge respectively.

8. A cartridge as claimed in claim 2, wherein the longitudinally extending absorbent material is confined within the casing and forms an inner tubular container for the particulate liquid-settable solid component and wherein the ends of the cartridge are sealed and a plurality of perforations are formed in the frangible casing adjacent each end of the cartridge.

9. A cartridge as claimed in claim 1, wherein the liquid-settable solid component is a hydraulic cement.

10. An anchoring cartridge for use in anchoring a reinforcing or fixing element in a borehole in a substrate, the cartridge comprising:
a frangible casing formed from an inert, liquid-impermeable material, the casing containing a particulate liquid-settable solid component;
wick means extending to different portions of said solid component for distribution of an activating liquid component therethrough suitable to cause all of said solid component to set when subjected thereto; and
means for introducing said liquid component to the interior of said liquid-impermeable casing for effecting said distribution by the action of said wick means.

* * * * *